Sept. 30, 1952  R. H. SHEPPARD  2,612,146
PILOT IGNITION
Filed Sept. 24, 1946
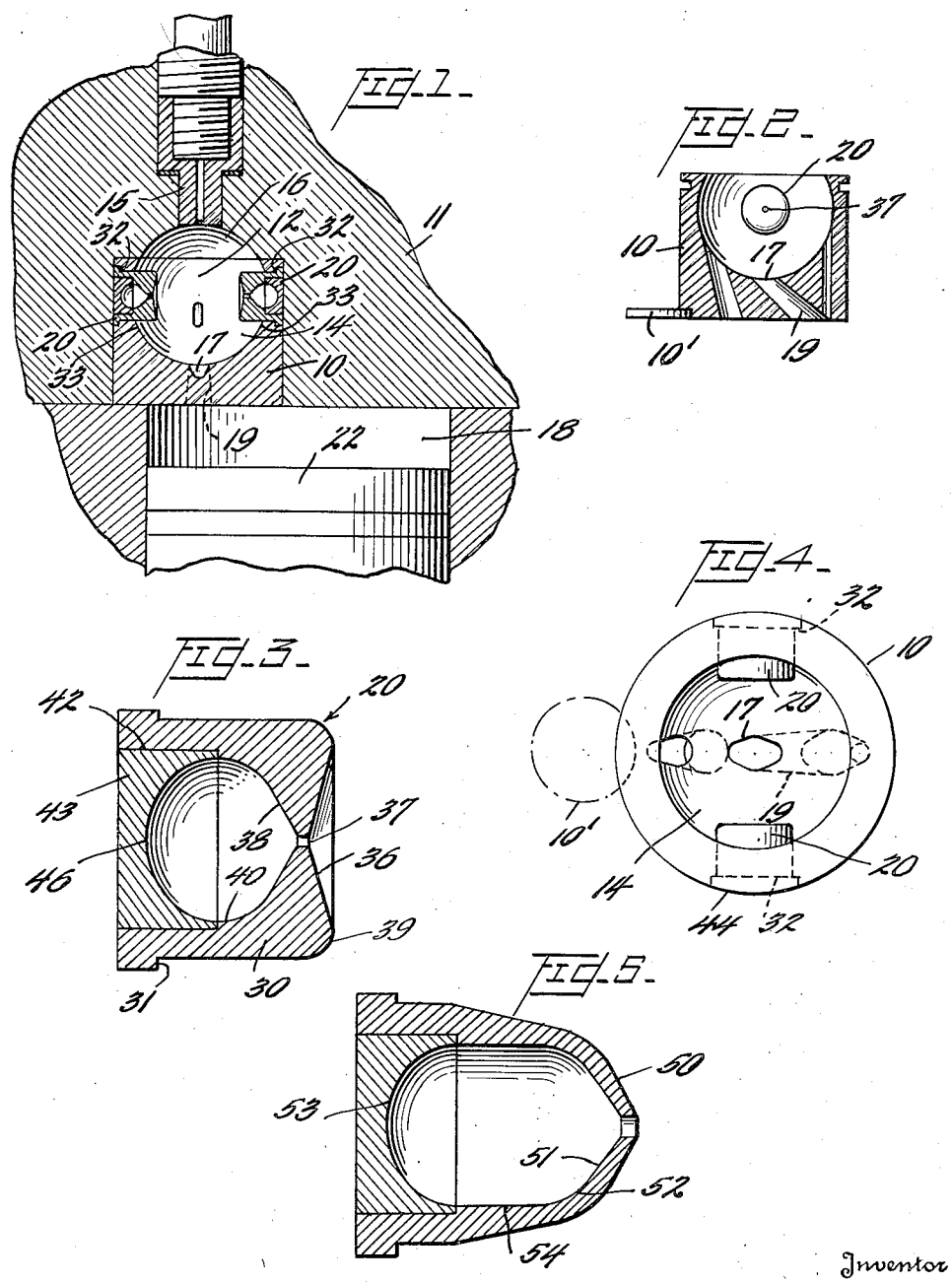
Inventor
Richard H. Sheppard,
By Henry H. Snelling
Attorney Patented Sept. 30, 1952

2,612,146

UNITED STATES PATENT OFFICE 2,612,146

PILOT IGNITION

Richard H. Sheppard, Hanover, Pa.

Application September 24, 1946, Serial No. 698,968

2 Claims. (Cl. 123—32)

This invention relates to the starting of diesel engines and has for its principal object the provision of a method of initiating ignition by heating a minor quantity of mixed fuel and air by passing this minor quantity into a small cell through an orifice of such size as not completely to vaporize the fuel so that when the cell discharges its fuel and air into the combustion chamber, the fuel will again be heated and this will form a pilot ignition flame so that the major charge within the combustion chamber is fired in a desired manner.

While it might not seem so, actually it is found that very small diesel engines are more difficult to start than the large engines, and an object of the present invention is to provide air cells in communication with the combustion chamber so that the small engine can be started with less effort than usual and with a lower compression, thus providing smoother running at normal speeds. The invention is applicable to all sizes of engines, working at any chosen pressure or temperature.

In my experimental work, I have been able to start my smallest size engine readily at the temperature of zero, Fahrenheit, at which time the oil is highly viscous. In its preferred form the air cell projects half way into the combustion chamber and is preferably duplicated on the opposite side. This extension gives the highly important advantage that the outside metal of the air cell is heated and this preserves the superheating of the contents of the air cells by the wire drawing effect through the small orifice.

In the drawings:

Figure 1 is a section through the combustion chamber.

Figure 2 is a view at right angles to Figure 1, also centrally of the combustion chamber.

Figure 3 is a much enlarged section through one of the air cells.

Figure 4 is a top plan view of the combustion chamber.

Figure 5 shows a modified air cell.

The combustion chamber 10 is of well-known form and is shown in my Patent No. 2,380,615, dated July 31, 1945. This block or combustion chamber is inserted into the cylinder head 11 so that the center line 12 of the discharge of the injector 15 will pass through the center of the combustion chamber, the chamber itself being spherical and formed in part by the domed surface 16 in the cylinder head 11. The line of discharge of the injector after passing through the center of the combustion chamber strikes the center throat 17 which leads to the engine cylinder 18 through the passage 19, indicated by dotted lines in Figure 1, and shown more fully in Figure 2, which figure shows all three of the throats which discharge into the cylinder 18 from the spherical combustion chamber space 14. The combustion chamber block 10 is held in place by the usual disc 10', or in any other desired fashion. The novel feature of the present case is the provision in the combustion chamber insert piece 10 of one or preferably two air cells each denoted as a whole by the numeral 20. These air cells have their common axis in a plane through the center of the combustion chamber recess 14, which plane is perpendicular to the center line of discharge 12. In other words, the axis of the air cells is perpendicular to the axis of the injector and is parallel to the head of the piston 22.

The preferred form of air cell is shown in Figure 3, and consists of a body 30, having a shoulder 31 fitting against a corresponding circular shoulder 32 in the combustion chamber 10 so that the air cell is about equally divided with respect to the margin 33 of the spherical combustion chamber proper, i. e. 14. The front end of the air cell body is reversely conical as shown at 36 to provide a funnel at the center, having an orifice 37. On the wall opposite the conical wall 36 is the conical surface 38. The angle that this wall makes apparently is not critical and the wall could be a curve, but I prefer the conical shape so that the radial section is as seen in Figure 3, that is, extending divergently from the axis. The inclosed portion of the radial section increases rather rapidly to the rounded end 39. The advantage of such a structure is that it carries heat away from the orifice 37 rather rapidly but retains the heat at the thicker portion, bearing in mind that since the cell projects into the combustion chamber up to the line 33, a very considerable amount of heat is given to the interior of the cell by the temperature in the combustion chamber.

The surface 40 is preferably a curve, tangent to the conical portion 38, and continues through a portion of the plug 43, which is merely pressed into the cylindrical opening 42 in the back of the air cell body 30 as it is then held in place by engagement with the cylinder head 11, which snugly embraces the combustion chamber insert 10 and also the air cell inserts 20 projecting into this combustion chamber. The rear 44 of each of the air cells is therefore cylindrical as best seen in Figure 4. I find it convenient to make the central portion of the rear surface of the plug 43 spherical as at 46, preferably of somewhat greater radius than the curve at and near the junction of the body 30 and the plug 43. The preferred form of the curve of the plug would seem to be a parabola, but the particular configuration of the air cell shown in Figure 3 is the best of many models that were tried out, although other models work fairly well.

The particular engine on which this device was first used is a diesel engine only 28½" high, 22½" long, with a 4" stroke in a 3" bore, and delivering 3¾ horsepower while turning at 1800 R. P. M. For an engine of this size, the air cell chamber is ¼" in diameter and the diameter of the orifice is twenty thousandths of an inch, and preferably the length of the orifice is the same as its diameter so, as seen in Figure 3, its section is a square. The size of the diameter is quite critical and a variance of as much as two thousandths of an inch seriously detracts from the operation. The area of this orifice apparently is not dependent on the cubic capacity of the air cell, but is dependent upon the volume of the chamber in the combustion chamber block which in turn varies with the volume of the engine cylinder. The chamber 14 in which combustion takes place is spherical, as previously recited, with the radius of .53". As shown in my copending case, S. N. 705,219, which contains the broad claims, for a larger engine the air cell diameter would be increased proportionately as would the orifice diameter. As an example: for a 4" bore engine the cell would have a major diameter of a half inch and the orifice diameter would give best results at .045".

In Figure 5 is shown a modified form of air cell. This differs considerably from the preferred form in that the funnel-shaped front of the preferred form is replaced by a conical surface 50, slanting in an opposite direction and therefore parallel with the inner surface 51 which, as in the preferred form, is at an angle of 60°. Between the front curved portion 52 and the curve 53 of the plug which is numbered 43, as it is exactly similar to the one in the preferred form of air cell, there is a cylindrical portion 54 which adds materially to the volume of the air cell. This modified air cell does not give as good service as the preferred form shown in Figure 3. The thin wall between surfaces 50 and 51 allows more heat to pass from the combustion chamber into the chamber of the air cell and the air cell body gets considerably hotter, but it is believed that the lower efficiency of this type is due to the fact that the mixture of fuel and air taken into the air cell chamber gets so hot that when it is discharged again through the orifice 57, the fuel is completely vaporized. At first thought, this would seem to be an advantage, but practice has shown that diesel fuel should be discharged in droplets, extremely tiny, it is true, but there must be liquid particles. An example of this can readily be seen from the action of gasoline when used to start a diesel engine. If the engine is very cold, the gasoline will start the engine, but when the temperature gets to a normal point, the engine will cease turning over on the gasoline, but will run perfectly if the heavy oil is substituted.

Having described my invention, what I claim is:

1. The combination in an internal combustion engine of a pre-combustion chamber space and a throat leading therefrom, an injector discharging into the space, and a pair of coaxial members each having therein a cavity communicating with the space through an orifice of such size as to heat fuel and air by wire-drawing effect without completely vaporizing the fuel, the common axis of the two orifices lying in a horizontal plane perpendicular to the line of discharge of the injector and at right angles to a plane containing the axis of the throat, said orifice diameters varying with the bore of the cylinder of the engine and being about .020" for a three inch bore and a quarter inch diameter cavity, about .045" for a four inch bore and a half inch diameter cavity, etc.

2. In a diesel engine of the type having a cylinder block with a cylinder within the block, a piston within the cylinder, a cylinder head closing the top of the cylinder, said cylinder head having a pre-combustion chamber therein and a throat leading from the pre-combustion chamber to the space in the cylinder above the piston, and an injector discharging into the pre-combustion chamber: the combination in which an air cell projects into the pre-combustion chamber, together with an additional air cell coaxial with the first air cell and both air cells project into the pre-combustion chamber roughly half their axial length so that the orifices of the air cells are well within the margin of the pre-combustion chamber.

RICHARD H. SHEPPARD.

REFERENCES CITED

The following references are of record in the file of this patent:

UNITED STATES PATENTS

| Number | Name | Date |
|---|---|---|
| 1,987,655 | Lang | Dec. 5, 1933 |
| 2,001,535 | Lang | May 14, 1935 |
| 2,071,241 | Thomas | Feb. 16, 1937 |
| 2,076,030 | Kahllenberger | Apr. 6, 1937 |
| 2,098,031 | Essl | Nov. 2, 1937 |
| 2,208,631 | Dietrich | July 23, 1940 |
| 2,380,615 | Sheppard | July 31, 1945 |

FOREIGN PATENTS

| Number | Country | Date |
|---|---|---|
| 146,350 | Switzerland | July 1, 1931 |
| 714,411 | France | Nov. 13, 1931 |
| 372,356 | Great Britain | May 5, 1932 |
| 399,369 | Great Britain | Oct. 5, 1933 |
| 404,838 | Great Britain | Jan. 25, 1934 |
| 595,454 | Germany | Nov. 13, 1935 |
| 119,573 | Australia | Mar. 1, 1945 |